R. HAMILTON.
CULTIVATING HARROW.
No. 190,031. Patented April 24, 1877.
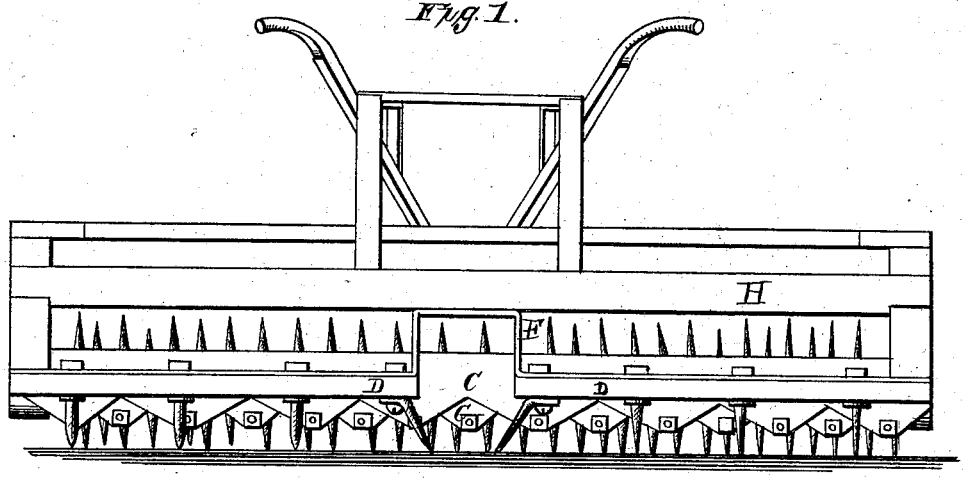
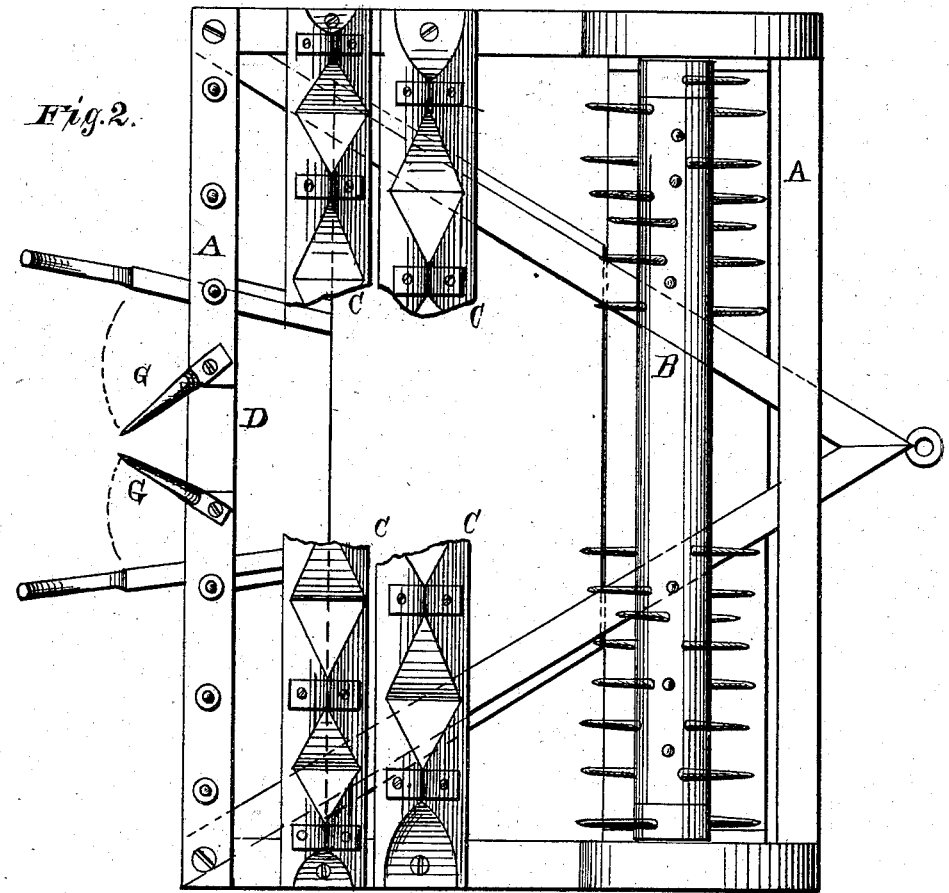
WITNESSES
Franck L. Durand
Frank Galt
INVENTOR
Robert Hamilton
Alexander Mason
ATTORNEYS.

UNITED STATES PATENT OFFICE.

ROBERT HAMILTON, OF FRANKLIN, INDIANA.

IMPROVEMENT IN CULTIVATING-HARROWS.

Specification forming part of Letters Patent No. 190,031, dated April 24, 1877; application filed March 15, 1877.

*To all whom it may concern:*

Be it known that I, ROBT. HAMILTON, of Franklin, in the county of Johnson, and in the State of Indiana, have invented certain new and useful Improvements in Cultivating-Harrows; and do hereby declare that the following is a full, clear, and exact description thereof, reference being had to the accompanying drawings, and to the letters of reference marked thereon, making a part of this specification.

The nature of my invention consists in the use of a rear harrow-bar, with movable or adjustable cultivating-teeth, to be used upon a frame, and in connection with a revolving-toothed roller, as an improvement upon my patent of November 7, 1876, No. 184,150.

To enable others skilled in the art to make and use my invention, I will proceed to describe its construction and operation.

In the annexed drawings, making part of this specification, Figure 1 represents a rear view of the machine, and Fig. 2 a bottom view of same with part broken away.

In the figures, A represents a rectangular harrow-frame, constructed in the usual manner, and carrying crosswise of it a toothed revolving roller, B, and one or more drag-bars, C C, having depressions and elevations upon their under sides, as represented.

At the rear end of the frame is a bar, D, which is in two pieces, which are connected together at their inner ends by a bridge-piece, F.

This bridge-piece is secured to the bar H at the rear end of the harrow-frame, and is constructed in such a manner that it will pass over young corn and plants in rows without injuring them.

The bar D is provided with cultivator or harrow teeth, as seen.

At each side of the center opening in the bar D, or at the ends of the bridge, are two harrow or cultivator teeth, G G. These teeth are so arranged and connected to the bar D that their lower ends may be adjusted to or from the plants being cultivated, for the purpose of cultivating as close to the plant as desirable, and according to the nature of the plant.

In using this harrow for cultivating growing plants, the drag-bars C C are removed, and the center teeth of the roller B are also removed; then the harrow will pass over the plants, and cultivate upon each side of them without damage.

Having thus fully described my invention, what I claim as new, and desire to secure by Letters Patent, is—

In combination with the roller B, having teeth arranged thereon each side of a central space, the rear bar D, having bridge F, and provided with two angular pivoted harrow-teeth, G G, all substantially as set forth.

In testimony that I claim the foregoing I have hereunto set my hand this 6th day of March, 1877.

ROBERT HAMILTON.

Witnesses:
 FRANK GALT,
 JOHN SCHROEDER.